United States Patent [19]

Weber

[11] 4,132,151
[45] Jan. 2, 1979

[54] KEY CUTTING APPARATUS

[75] Inventor: Günter Weber, Wuppertal, Germany

[73] Assignee: Neiman S.A., Courbevoie, France

[21] Appl. No.: 823,751

[22] Filed: Aug. 11, 1977

[30] Foreign Application Priority Data

Aug. 24, 1976 [DE] Fed. Rep. of Germany ....... 2637969

[51] Int. Cl.² .............................................. B23C 3/35
[52] U.S. Cl. .................................... 90/13.05; 90/13.1; 90/62 R
[58] Field of Search ................... 90/62 R, 13.1, 13.05, 90/13.2; 33/23 K

[56] References Cited

U.S. PATENT DOCUMENTS

| | | | |
|---|---|---|---|
| 2,282,473 | 5/1942 | Hoffmann | 33/23 K |
| 2,477,999 | 8/1949 | Miller | 33/23 K |
| 2,551,182 | 5/1951 | Tillett et al. | 90/13.1 X |

FOREIGN PATENT DOCUMENTS 1142533  1/1956  Fed. Rep. of Germany ............ 90/13.1

Primary Examiner—Gil Weidenfeld
Attorney, Agent, or Firm—William Anthony Drucker

[57] ABSTRACT

For milling a control groove in a vehicle safety key there is used a motor-driven milling head connected by a linkage such as a pantograph to a tracer member. The tracer member follows a template groove. Since it is desired to vary the shape of the groove the template groove of the present invention is formed in sections on a plurality of strips some or all of the strips carrying several groove sections, said strips being shiftable in relation to each other so as to join up selected sections of the strips to form a single groove.

8 Claims, 2 Drawing Figures

KEY CUTTING APPARATUS

BACKGROUND OF THE INVENTION

The invention relates to a device for milling the control groove of a safety key by means of a motor-driven milling head.

There are known safety keys which comprise a controlling groove and a locking groove on each of their two flat sides. When the key is inserted in the cylinder core, cams, which are arranged on lamina tumblers and project into the central recess of the lamina tumblers, lie in these grooves. The cams are located at different points of the recesses, and on a key fitting the locking cylinder, the control groove has areas which are at different distances from the key longitudinal axis in accordance with the cams and which thus adjust the tumblers in such a way that none of the tumblers projects from the cylinder core.

For the initial equipment of locking cylinders, the control grooves are milled into the keys by numerically controlled machines. This is a very expensive method for the manufacture of spare keys.

It is the object of the invention to provide a simple device for the fast and exact production of control grooves in safety keys.

SUMMARY OF THE INVENTION

According to the invention, there is provided a template for use with a device for milling a control profile of a safety key, said device including a table, a clamp for securing a key blank to be cut fixedly mounted on said table, a motor-driven milling head movably mounted on said table, a tracer member connected to said milling head for effecting control of movement thereof and means to effect the connection between said tracer member and said milling head, said template comprising a carrier for mounting on said table in fixed relationship to said clamp, a plurality of strips arranged side by side on said carrier, each strip being slidably adjustable on the carrier in the direction of its longitudinal axis, coding indicia on said carrier in relation to which said strips are settable, and means for securing said trips in the positions selected, a plurality of strips being formed each with at least two grooves of differing profiles extending across the entire width of the strip, whereby on setting said strips against said indicia accordng to a predetermined code a continuous groove is formed extending transversely of said strips, said continuous groove serving to guide said tracer member as the milling head effects cutting of the key to the selected coded profile.

The device according to the invention allows safety keys of the kind mentioned at the beginning to be produced inexpensively, accurately and quickly as single parts or in small batches. It is possible to provide a wide variety of control grooves by means of interchanging the strips as well as by additional strips.

In a further development, the invention proposes that the strips should be longitudinally displaceable and comprise at least two groove sections of different construction, whereby additional strips are not required and widely differing control grooves can be produced merely by the displacement of the strips.

The groove sections are arranged substantially transversely to the strip longitudinal axis, whereby space is available on the strips for a major number of groove sections one beside the other. To provide a smooth groove transition from one strip to the next, it is proposed that the groove section portion adjoining the adjacent strip should form the same angle with the strip longitudinal axis as the adjoining groove portion of the adjacent strip.

In order to vary the groove pattern, the groove sections may comprise curves or bends and the strips may rest against one another in a groove area against which the tumblers rest in the corresponding key control groove when the key is fully inserted in the lock.

Since more than one groove section is arranged on each strip, several strips may be identical in design. The groove beginning may be formed by a strip comprising a groove portion that is parallel to the key longitudinal axis, and these groove beginning portions of different grooves parallel to the key longitudinal axis may be arranged at specific varying distances from the key longitudinal edge and may not be provided with butting faces, whereby the locking groove beginning performs the additional function of a locking profile because the key can be inserted into the lock only if the groove beginning agrees with the tumbler cams arranged at a specific point (See German Patent Application No. P 22 04 630.6-15).

Preferably, it is proposed that a strip comprising a groove transitional area should be arranged between the identical strips and the strip comprising the groove beginning. Furthermore, the groove end may be formed by a separate strip.

In order to increase the groove variations, it is proposed that the rears of the strips should have grooves that differ from those provided on the fronts. The strips are particularly easy to produce if they are made from die castings or plastics material.

Preferably, it is proposed that the exact position of the longitudinally displaceable strips should be determinable by detents, an adjustment of the strips thus being obviated. In order to make it possible for a required groove to be rapidly combined by the strips, it is proposed that the strips should rest on a surface on which setting scales for the strips are arranged.

An exact guidance of the strips is ensured by the strips being guided between two lateral jaws. For fixing the strips, a jaw or a portion thereof may be clampable relative to the other one.

In order to manufacture the control groove of the key particularly precisely, the template groove may be constructed on a scale that is larger than the control groove and a pantographic linkage may be arranged between the milling head and the tracer member. Preferably, the template is secured on the work table of an engraving machine so that, apart from the new template according to the invention, no further new devices are required.

BRIEF DESCRIPTION OF DRAWINGS

An exemplified embodiment of the invention is shown in the drawings and will be described in more detail hereinafter. In the drawings.

DESCRIPTION OF PREFERRED EMBODIMENT

Figure 1:
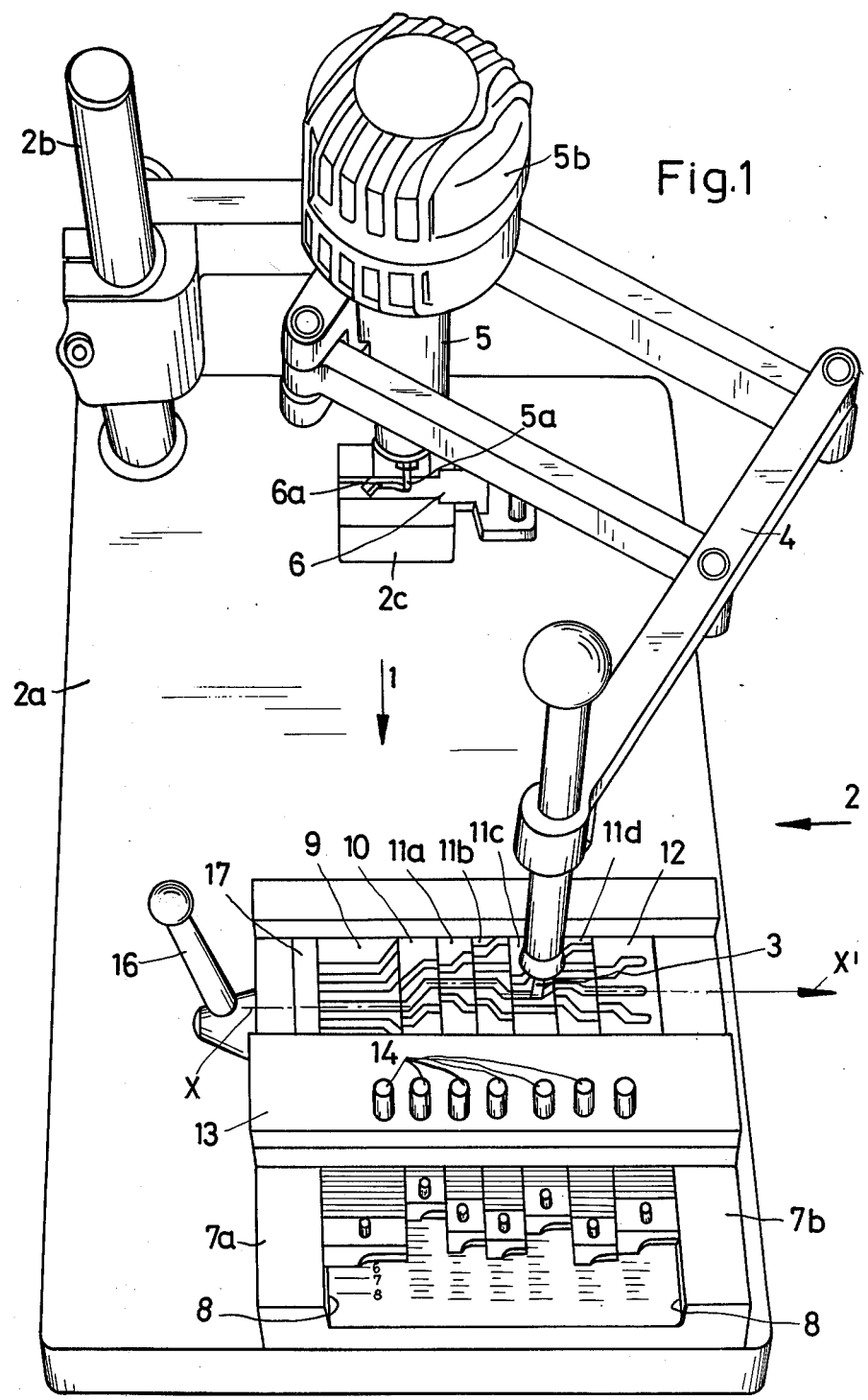
FIG. 1 shows a perspective view of a milling unit with the template placed on the milling table.
Figure 2:
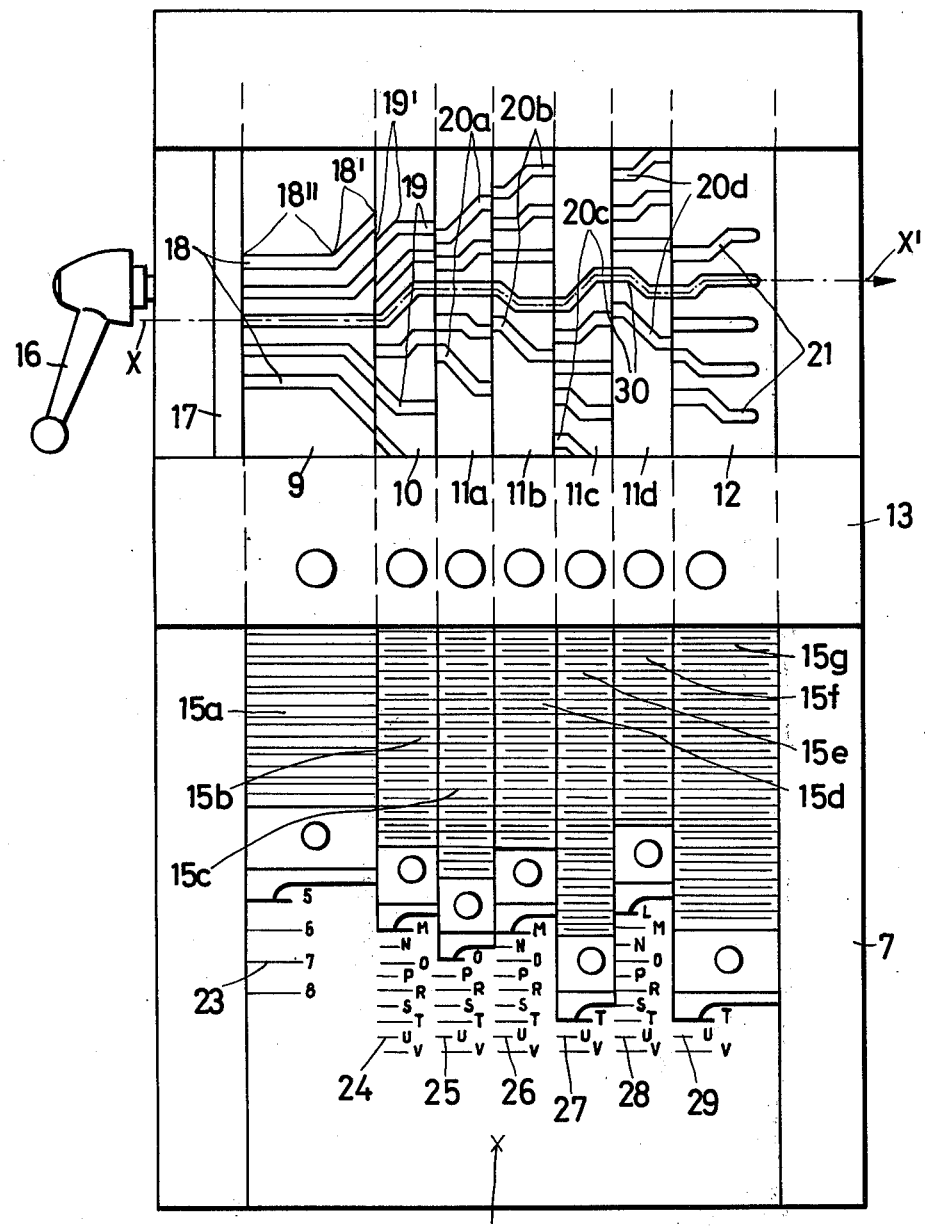
FIG. 2 shows a top view of the template

A rod 2b, to which the linkage of a pantograph is hinged, is vertically secured to the work table 2a of an engraving or milling machine 2. Fastened to the work table 2a is a clamping device 2c for a safety key 6, one of the two key shank flat sides of which points to the top. Above the key 6, a vertical milling unit 5, comprising the milling head 5a and the motor 5b, is secured to the pantograph linkage 4. A vertical tracer member 3, which lies in a groove 18, 19, 20a-20d 21, of a template secured to the work table 2a, is located at the pantographic linkage end that is opposite to the rod 2b. The milling unit 5 and the tracer member 3 are secured to the pantograph in such a way that a movement of the tracer member 3 produces a movement of the milling head 5a on a reduced scale.

The template 1 has a rectangular bottom which rests on the work table 2a and forms a horizontal surface 22 at its top and comprises parallel jaws 7a and 7b on two opposite sides so that, together with the jaws, the bottom shows a U-shaped cross section. Strips 9, 10, 11a-11d and 12, whose total width corresponds to the distance between the jaws, lie between the jaws 7a and 7b and parallel thereto. The strips, which are displaceably guided relative to the bottom and the jaws, have approximately the height of the jaws and are covered by a holding member 13, whose ends are fastened on the jaws. Embedded in the holding member 13 are spring-loaded plunger pins 14 which project from the underside of the holding member and engage in transverse recesses 15a-g in the strips which are arranged at specific intervals. When one of the strips 9–12 is to be moved, the plunger pin 14 located thereabove is pulled out by hand to the top to some extent against the spring pressure and is released after the positional change of the strip.

In a recess in the jaw 7a that is directed towards the strips, there is embedded a jaw part 17 which rests against the outermost strip 9 and can be pressed against the strip 9 by means of a screw carried in the jaw 7a and actuated by a lever 16. By this means, the strips 9–12 can be clamped like a vice.

In the exemplified embodiment, the groove formed by the template is composed of seven strips, of which four grooves 11a-d have both the same width and the same groove sections 20a-d. The five groove sections of these four strips and the groove sections of the remaining strips have different patterns, so that a wide variety of groove shapes can be combined. In the groove areas 30, in which the central strips (11a-11d) rest against one another, the grooves have a pattern that is at right angles to the strip longitudinal axis, since the cams lie in this area of the control groove 6a of the key 6 when the key is fully inserted. Between these areas 30, the groove sections extend at an angle of 45° or at right angles to the strip longitudinal axis.

Each combined groove ends in an end strip 12 which is wider than the central strips having blind grooves 21 and begins in a strip 19 which is wider than the end strip. Each of the five groove beginnings formed by the strip 9 comprises at the commencement a groove portion 18" which is parallel to the key longitudinal axis and at right angles to the strip longitudinal axis and which is arranged at a specific varying distance from the key longitudinal axis and has no butting faces at the beginning. By this means, the locking groove beginning is given the additional function of a locking profile, since the key can only be introduced into the keyhole when the cams of the tumblers are at the level of the locking groove beginning. The groove portions 18" merge in groove portions 18' which have 45 degree gradients in different directions and of different length. Between the strip 9 and the central strips 11a-d, there is located a compensating strip 10 which compensates for the dimensional differences in the locking grooves of the strips 9 relative to the grooves of the central strips, which differences are necessary for the additional locking function of the locking groove beginning.

The surface 22 forming the top of the template base comprises for each strip a setting scale 23–29, against which a flattened edge of a strip rests in each case. The graduation of these scales does not correspond to the increments of the lockings provided in the key but is designed to position the groove sections of the strips relative to one another in such a way that when the strips are correctly set, according to a setting list required for the scale graduation, there is produced a continuous traceable curve which corresponds to the control groove of the key. There is thus required in addition to the code list for the key lockings a special setting list for the scale graduations of the template, whereby an additional safeguard against any unauthorised production is provided.

I claim:

1. In a device for milling a control profile of a safety key, including a table, a clamp for securing a key blank to be cut fixedly mounted on said table, a motor-driven milling head movably mounted on said table, a tracer member connected to said milling head for effecting control of movement thereof and means to effect the connection between said tracer member and said milling head, the provision of a template comprising:
    (a) a carrier for mounting on said table in fixed relationship to said clamp,
    (b) a plurality of strips arranged side by side on said carrier, each strip being slidably adjustable on the carrier in the direction of its longitudinal axis,
    (c) coding indicia on said carrier in relation to which said strips are settable, and
    (d) means for securing said strips in the positions selected.
    (e) a plurality of strips being formed each with at least two grooves of differing profiles extending across the entire width of the strip, whereby on setting said strips against said indicia according to a predetermined code a continuous groove is formed extending transversely of said strips, said continuous groove serving to guide said tracer member as the milling head effects cutting of the key to the selected coded profile.

2. A template according to claim 1, wherein an end strip positioned at one side of the carrier has transverse grooves each serving as a beginning of the continuous groove, each transverse groove having a straight portion thereof, at the extreme end of the continuous groove, disposed at right angles to the longitudinal axis of the strip.

3. A template according to claim 2, wherein the different groove profiles of one strip of a series of said strips arranged side by side are indentical to those groove profiles of the other strips of said series.

4. A template according to claim 3, wherein one strip having grooves with profiles different from the groove profiles of said end strip and said series of strips is arranged between said end strip and said series and serves to effect a transitional connection of the selected grooves of the end strip and the first strip in said series.

5. A template according to claim 4, wherein a further end strip positioned at the other side of the carrier alongside said series is provided with blind grooves of which the selected one serves as the end of the continuous groove.

6. A template according to claim 1, wherein a portion of each groove of one strip forms the same angle with the strip longitudinal axis as does a portion of the adjoining grooves of the adjacent strip.

7. A template according to claim 1, wherein said means for securing said strips in the positions selected comprise detents mounted on said carrier, engageable with transverse recesses formed in said strips.

8. A template according to claim 1, wherein said means for securing said strips in the positions selected comprise two lateral jaws mounted on said carrier between which jaws the strips extend.

* * * * *